United States Patent
Solven et al.

(10) Patent No.: US 9,268,435 B2
(45) Date of Patent: Feb. 23, 2016

(54) SINGLE LAYER CAPACITIVE SENSOR AND CAPACITIVE SENSING INPUT DEVICE

(71) Applicant: Synaptics Incorporated, Santa Clara, CA (US)

(72) Inventors: Derek Solven, San Jose, CA (US); Tracy Scott Dattalo, Santa Clara, CA (US); Tyler Moore, Redwood City, CA (US)

(73) Assignee: Synaptics Incorporated, San Jose, CA (US)

( * ) Notice: Subject to any disclaimer, the term of this patent is extended or adjusted under 35 U.S.C. 154(b) by 344 days.

(21) Appl. No.: 13/797,493

(22) Filed: Mar. 12, 2013

(65) Prior Publication Data

US 2014/0267127 A1  Sep. 18, 2014

(51) Int. Cl.
*G06F 3/041* (2006.01)
*G06F 3/044* (2006.01)

(52) U.S. Cl.
CPC ............. *G06F 3/0416* (2013.01); *G06F 3/044* (2013.01); *G06F 3/0412* (2013.01)

(58) Field of Classification Search
CPC ............................................ G06F 2203/04107
USPC .................................................. 345/156–184
See application file for complete search history.

(56) References Cited

U.S. PATENT DOCUMENTS

| | | |
|---|---|---|
| 5,374,787 A | 12/1994 | Miller et al. |
| 5,880,411 A | 3/1999 | Gillespie et al. |
| 5,952,998 A | 9/1999 | Clancy et al. |
| 7,030,860 B1 | 4/2006 | Hsu et al. |
| 7,218,124 B1 | 5/2007 | Mackey et al. |
| 7,358,741 B2 | 4/2008 | Sato et al. |
| 7,973,771 B2 | 7/2011 | Geaghan |
| 8,415,959 B2 | 4/2013 | Badaye |
| 8,723,834 B2 | 5/2014 | Simmons et al. |
| 2005/0122119 A1 | 6/2005 | Barlow |
| 2006/0274055 A1* | 12/2006 | Reynolds ............. H03K 17/962 345/174 |
| 2008/0047764 A1 | 2/2008 | Lee et al. |
| 2008/0252608 A1 | 10/2008 | Geaghan |
| 2009/0315570 A1 | 12/2009 | Chappell et al. |
| 2010/0292945 A1* | 11/2010 | Reynolds ................ G06F 3/044 702/65 |
| 2011/0062971 A1* | 3/2011 | Badaye .................... G06F 3/044 324/686 |
| 2012/0026122 A1* | 2/2012 | Simmons .............. G06F 3/0418 345/174 |
| 2012/0026123 A1* | 2/2012 | Grunthaner ........... G06F 3/0418 345/174 |
| 2012/0098787 A1 | 4/2012 | Kim et al. |

\* cited by examiner

*Primary Examiner* — Carolyn R Edwards (57) ABSTRACT

A single-layer capacitive sensor comprises a user input region and a border region proximate to and outside of the user input region. The user input region includes a plurality of transmitter electrodes that are disposed within the user input region. The user input region also comprises a plurality of receiver electrodes disposed in a common stackup layer with the plurality of transmitter electrodes within the user input region such that the transmitter electrodes and the receiver electrodes make no crossings of one another in the common stackup layer or in any other layer within the user input region. The border region comprises a plurality of routing traces extending from the border region into the user input region to couple with the transmitter electrodes and the receiver electrodes. The border region also comprises a plurality of transmission traces disposed entirely within the border region.

20 Claims, 7 Drawing Sheets

SINGLE LAYER CAPACITIVE SENSOR AND CAPACITIVE SENSING INPUT DEVICE

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones and tablet computers). Such touch screen input devices are typically superimposed upon or otherwise collocated with a display of the electronic system.

SUMMARY

A single-layer capacitive sensor comprises a user input region and a border region proximate to and outside of the user input region. The user input region includes a plurality of transmitter electrodes that are disposed within the user input region. The user input region also comprises a plurality of receiver electrodes disposed in a common stackup layer with the plurality of transmitter electrodes within the user input region such that the transmitter electrodes and the receiver electrodes make no crossings of one another in the common stackup layer or in any other layer within the user input region. The border region comprises a plurality of routing traces extending from the border region into the user input region to couple with the transmitter electrodes and the receiver electrodes. The border region also comprises a plurality of transmission traces disposed entirely within the border region.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements.

DESCRIPTION OF EMBODIMENTS

The following Description of Embodiments is merely provided by way of example and not of limitation. Furthermore, there is no intention to be bound by any expressed or implied theory presented in the preceding Background, Summary, or Brief Description of Drawings or the following Description of Embodiments.

Overview of Discussion

Herein, various embodiments are described that provide input devices, processing systems, and methods that facilitate improved usability. In various embodiments described herein, the input device may be a capacitive input device. Embodiments associated with single-layer capacitive sensor and capacitive sensing input devices which include single-layer sensors are described. Utilizing techniques described herein, efficiencies may be achieved by detecting and compensating for unwanted capacitive couplings between input objects and routing traces outside of a user input region of a single-layer capacitive sensor.

Discussion begins with a description of an example input device with which or upon which various embodiments described herein may be implemented. Some example stack-ups which include a single-layer capacitive sensor and which may be utilized as a portion of a capacitive sensing input device, are then described. Some examples of single-layer capacitive sensors are described which include transmission traces disposed in a border region that is outside of a user input region of the single-layer capacitive sensor. Portions of some example capacitive sensing input devices, which includes a single-layer capacitive sensor, are then described. This is followed by description of an example processing system and some components thereof. The processing system may be utilized with an input device, such as a capacitive sensing input device.

Example Input Device

Figure 1:
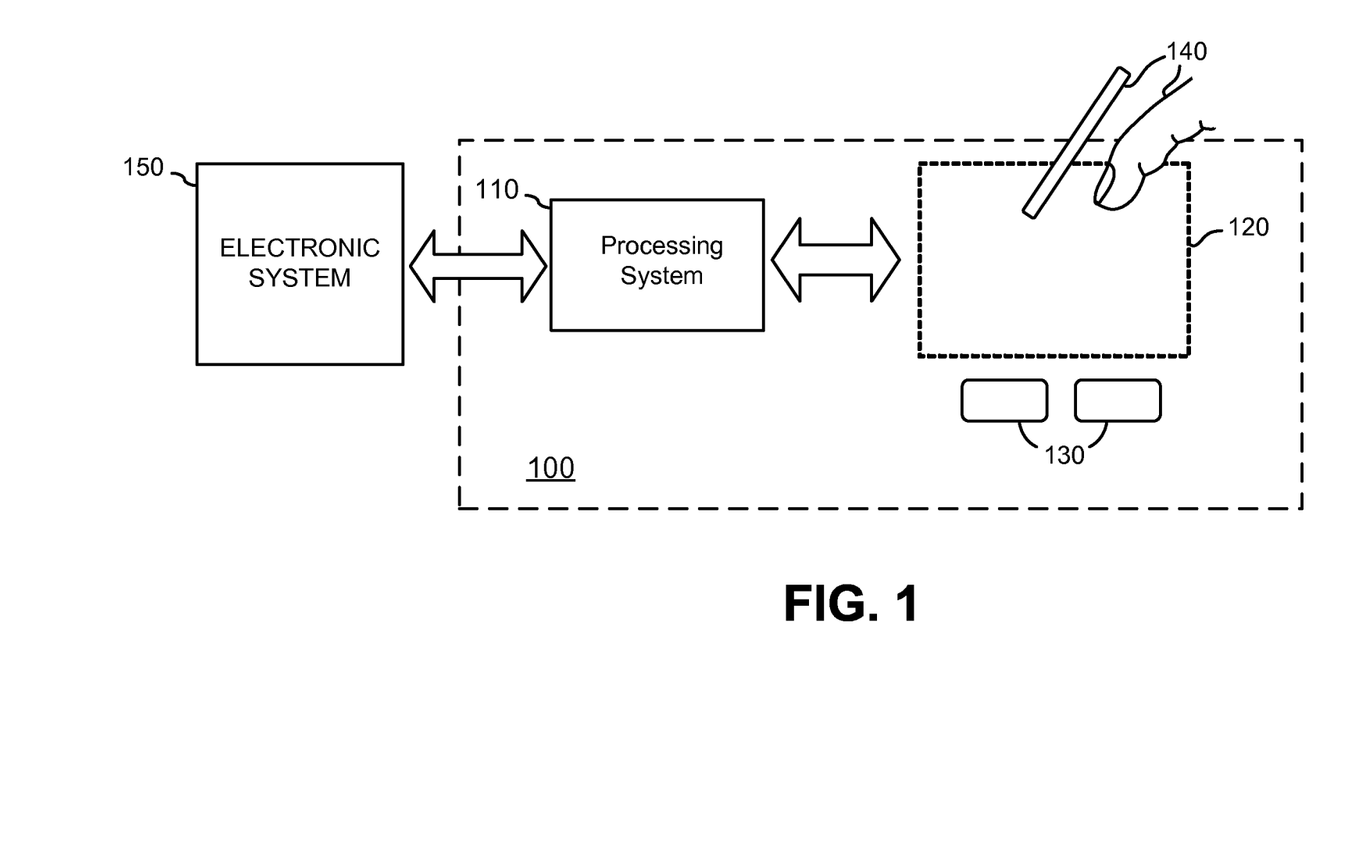
FIG. 1 is a block diagram of an example input device, in accordance with embodiments.

Turning now to the figures, FIG. 1 is a block diagram of an exemplary input device 100, in accordance with various embodiments. Input device 100 may be configured to provide input to an electronic system/device. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic systems could be a host or a slave to the input device.

Input device 100 can be implemented as a physical part of the electronic systems, or can be physically separate from the electronic system. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1, input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near input device 100, in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in sensing region 120. Input device 100 comprises one or more sensing elements for detecting user input. As a non-limiting example, input device 100 may use capacitive techniques.

Some implementations are configured to provide images that span one, two, three, or higher dimensional spaces. Some implementations are configured to provide projections of input along particular axes or planes.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor electrodes or sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive. In some embodiments, one or more receiver electrodes may be operated to receive a resulting signal when no transmitter electrodes are transmitting (e.g., the transmitters are disabled). In this manner, the resulting signal represents noise detected in the operating environment of sensing region 120.

In FIG. 1, a processing system 110 is shown as part of input device 100. Processing system 110 is configured to operate the hardware of input device 100 to detect input in sensing region 120. Processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, processing system 110 also comprises electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, processing system 110 responds to user input (or lack of user input) in sensing region 120 directly by causing one or more actions. Example actions include changing operation modes, as well as GUI actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 may be a touch screen, and sensing region 120 overlaps at least part of an active area of a display screen. For example, input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other tangible storage technology.

Example Sensor Electrode Pattern

Figure 2A:
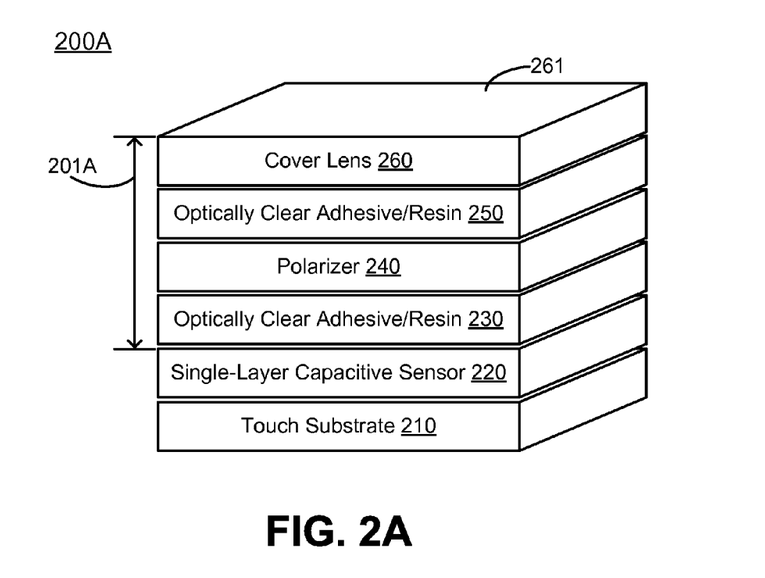
FIGS. 2A and 2B are side perspective views of example stackups which include a single-layer capacitive sensor and which may be utilized as a portion of a capacitive sensing input device, according to some embodiments.
Figure 2B:
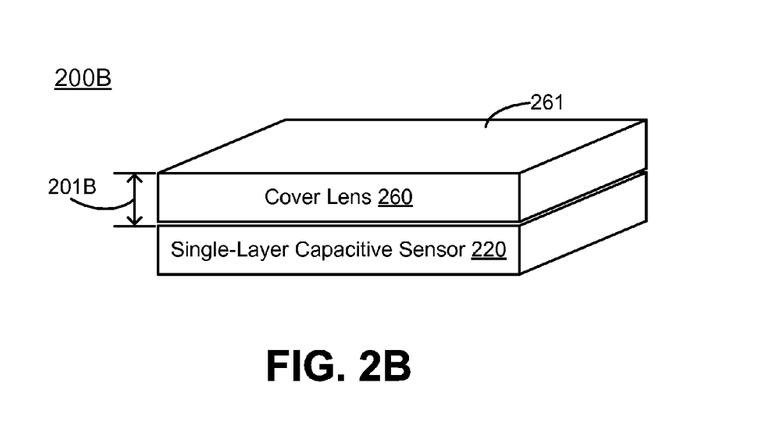

FIGS. 2A and 2B are side perspective views of example stackups 200 which include a single-layer capacitive sensor and which may be utilized as a portion of a capacitive sensing input device, according to some embodiments. It should be appreciated that FIGS. 2A and 2B are non-limiting examples, and that variations on these examples are possible.

FIG. 2A shows an example stackup 200A of some layers of an input portion of a capacitive sensing input device. In some embodiments stackup 200A is part of, or is over overlaid upon, a display screen such as a liquid crystal display. A single-layer capacitive sensor 220 is disposed above touch substrate 210. Touch substrate 210 comprises a layer of glass or other optically clear substrate, and in some embodiments is a portion of a liquid crystal display (LCD). In some embodiments, single-layer capacitive sensor 220 is formed of an optically transparent material, such as, for example, indium tin oxide (ITO). A first layer of an optically clear adhesive (OCA) or an optically clear resin (OCR), 230, is disposed between single-layer capacitive sensor 220 and a polarizer 240. A second layer of an OCA/OCR, 250, is disposed between polarizer 240 and cover lens 260. Cover lens 260 is an optically clear material such as glass, plastic, or an optically clear coating. Surface 261 of cover lens 260 represents a user input surface and a topmost portion of stackup 200A. Distance 201A is the distance between the single-layer capacitive sensor 220 and user input surface 261 in stackup 200A, and represents a minimum distance of separation between single-layer capacitive sensor 220 and an input object 140. A variation of stackup 200A, in some embodiments, reverses the order of single-layer capacitive sensor 220 and touch substrate 210 such that single-layer capacitive sensor 220 is disposed beneath touch substrate 210 in the stackup.

FIG. 2B shows an example stackup 200B of some layers of an input portion of a capacitive sensing input device. In some embodiments stackup 200B is part of, or is over overlaid upon, a display screen such as a liquid crystal display. Distance 201B is the distance between the single-layer capacitive sensor 220 and user input surface 261 in stackup 200B, and represents a minimum distance of separation between single-layer capacitive sensor 220 and an input object 140.

Example Single-Layer Capacitive Sensors

Figure 3A:
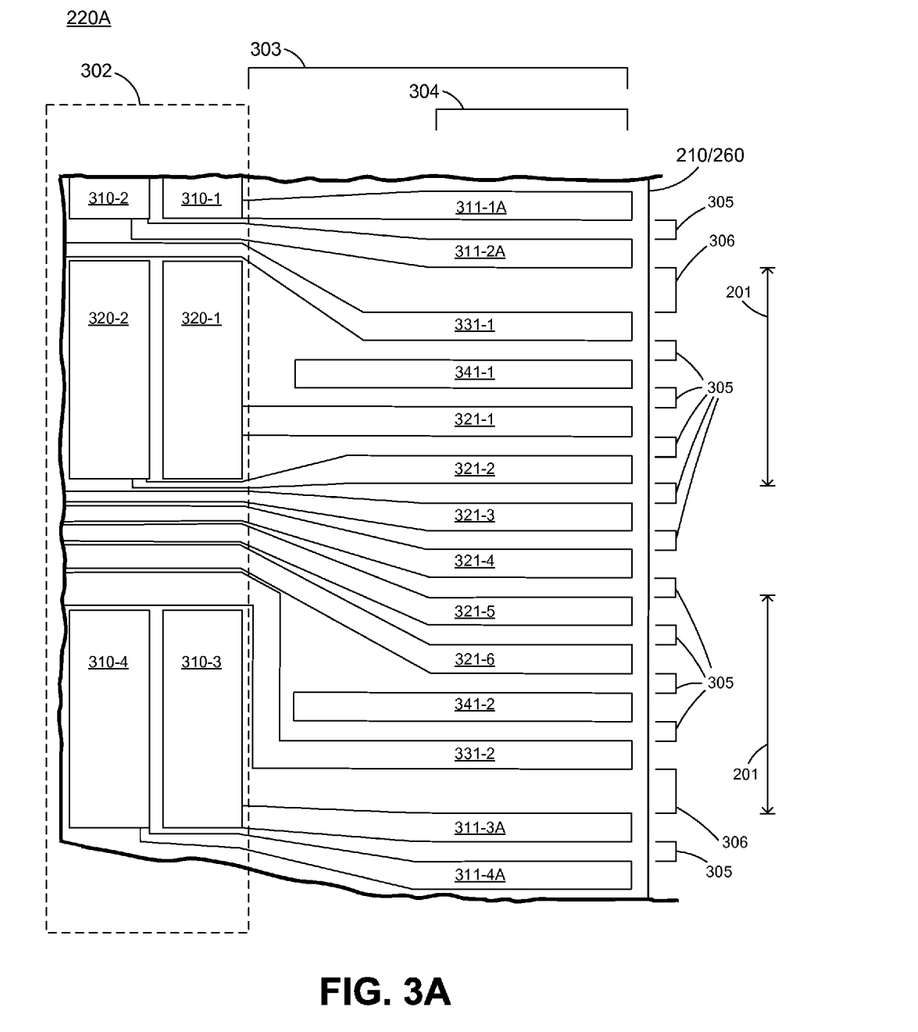
FIG. 3A is a top plan view of a portion of a single-layer capacitive sensor, according to some embodiments.

FIG. 3A is a top plan view of a portion of a single-layer capacitive sensor, according to some embodiments. Single-layer capacitive sensor 220A includes a user input region 302 and a border region 303 that is proximate to, outside of, and bordering on user input region 302. Single-layer capacitive sensor 220A is disposed above or below a surface such as substrate 210 or cover lens 260 as has been depicted and described in accordance with FIGS. 2A and 2B.

User input region 302 comprises a plurality of transmitter electrodes 320 (320-1 and 320-2 visible) and a plurality of receiver electrodes 310 (310-1, 310-2, 310-3, and 310-4 visible) that are disposed in a single common layer with one another. In some embodiments, this allows receiver electrodes 310 and transmitter electrodes 320 to be disposed in a single deposition step. In one embodiment, this single common layer is a layer of a stackup 200. Within user input region 302, transmitter electrodes 320 and receiver electrodes 310 make no crossings of one another in their common layer or in any other layer of a stackup 200. That is to say, no jumpers or vias are required within user input region 302 or within border region 303 in order to route routing traces to the transmitter electrodes 320 and receiver electrodes 310. It should be appreciated that the size, shape, and arrangement of transmitter electrodes 320 and receiver electrodes 310 may vary in other embodiments, so long as they are disposed in a single common layer with one another and make no crossings of one another in user input region 302, border region 303, their common layer, or any other layer of stackup 200.

Receiver electrodes 310 and transmitter electrodes 320 in user input region 302 may be utilized to generate all or part of the sensing region of a input device 100, according to various embodiments. Input device 100 is configured as a capacitive input device when utilized with a capacitive sensor electrode pattern. In various embodiments, touch sensing includes sensing input objects anywhere in sensing region 120 and may comprise: no contact with any surfaces of the input device 100, contact with an input surface 261 of the input device 100, contact with an input surface 261 of the input device 100 coupled with some amount of applied force or pressure, and/or a combination thereof.

Capacitive pixels can be thought of as areas of localized capacitive coupling between transmitter electrodes 320 and receiver electrodes 310. The capacitive coupling between transmitter electrodes 320 and receiver electrodes 310 changes with the proximity and motion of input objects in the sensing region associated with transmitter electrodes 320 and receiver electrodes 310.

Figure 3B:
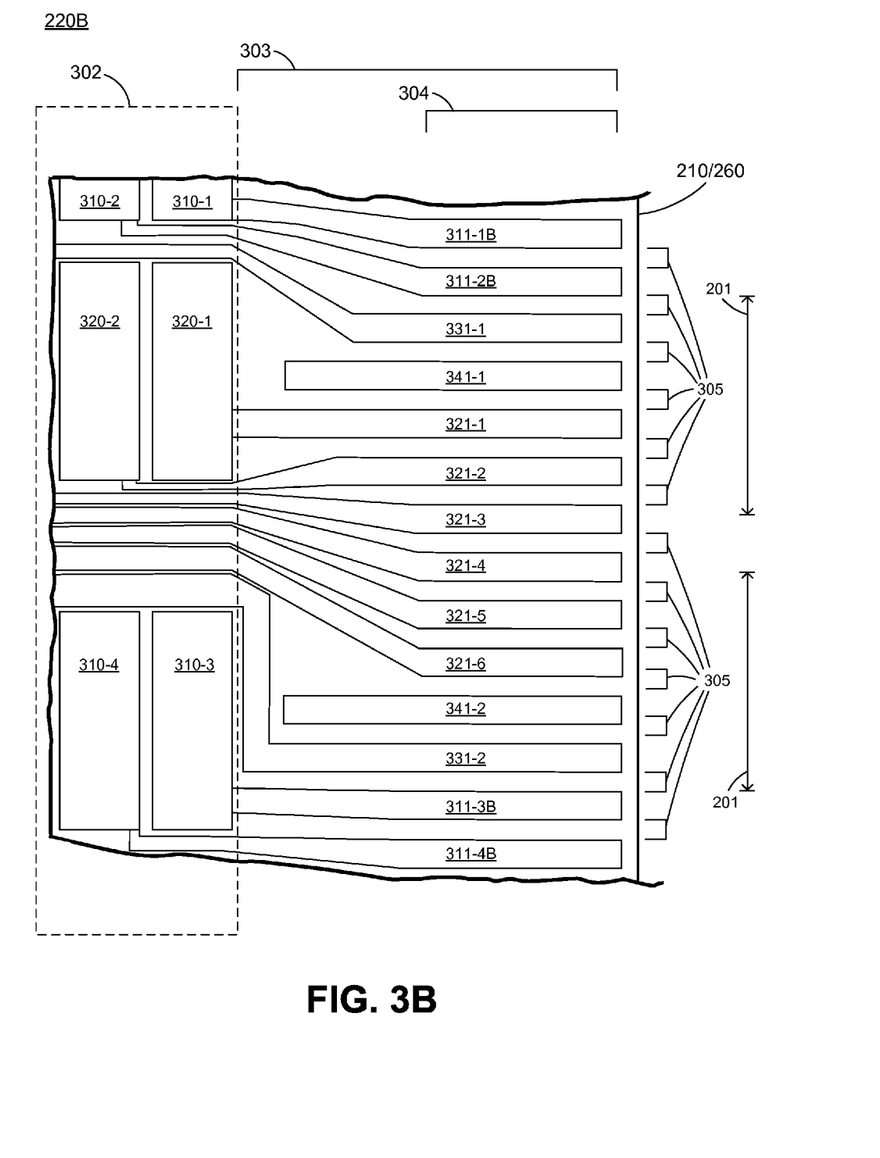
FIG. 3B is a top plan view of a portion of a single-layer capacitive sensor, according to some embodiments.

In some embodiments, receiver electrodes 310 and transmitter electrodes 320 of a single-layer capacitive sensor 220, such as 220A or 220B, are "scanned" to determine these capacitive couplings. That is, the transmitter electrodes 320 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 310 to be independently determined.

The receiver electrodes 310 may be operated singly or multiply to acquire resulting signals. The resulting signals may be used to determine measurements of the capacitive couplings at the capacitive pixels.

When performing transcapacitive sensing, a set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

Border region 303 comprises a plurality of routing traces 311, 321, and 331 along with a plurality of transmission traces 341. Routing traces 311, 321, 331 and transmission traces 341 are formed of an optically transparent conductive material such as, for example, ITO and are disposed in the same common layer with receiver electrodes 310 and transmitter electrodes 320. In some embodiments, this allows receiver electrodes 310, transmitter electrodes 320, routing traces 311, 321, 331, and transmission traces 341 to be disposed in a single deposition step. Routing traces 311, 321, and 331 all extend into user input region 302, while transmission traces 341 are disposed entirely within border region 303. Routing traces 311 (311-1A, 311-2A, 311-3A, and 311-4A depicted) are ohmically coupled with receiver electrodes 310 in user input region 302. For example, routing trace 311-2A is ohmically coupled with receiver electrode 310-2. Routing traces 321 (312-1 and 321-2 depicted) are ohmically coupled with transmitter electrodes 320 in user input region 302. For example, routing trace 321-1 is ohmically coupled with transmitter electrode 320-1. Routing traces 331 (331-1 and 331-2 depicted), when included, are grounds utilized to separate and shield transmitter electrodes 320 and their associated routing traces 321 from receiver electrodes 310 and their associated routing traces 311 in both user input region 302 and border region 303. Transmission traces 341 (341-1 and 341-2 depicted) are disposed entirely within border region 303 and are ohmically separated from all transmitter electrodes 320 and receiver electrodes 310 and other elements in user input region 302.

Border region 303 also comprises an anisotropic conductive film (ACF) bonding region 304 in which routing traces 311, 321, 331 and transmission traces 341 have portions which are configured for bonding with conductors in an ACF. This means that in ACF bonding region, routing traces 311, 321, 331 and transmission traces 341 are disposed such that portions are in parallel with one another, are configured to be of a size to which an ACF can bond, and are disposed at a pitch to which an ACF bond can be accomplished. The pitch of the parallel portions of routing traces 311, 321, 331 and transmission traces 341 may be non-uniform, as depicted in by the various sizes of gaps 305 and 306 in FIG. 3A, or may be uniform, as depicted by the uniform gaps 305 in FIG. 3B.

Because of minimum size requirements associated with ACF bonding, the parallel portions of routing traces 311, 321, 331 and transmission traces 341 in bonding region 304 are required to be of a size which is large enough to also allow some undesired transcapacitive coupling between routing traces 311 and 321 and in some instances between an input object and a pair of routing traces 311, 312. Coupling with input objects can have its largest prevalence between pairs of routing traces 311, 312 that are spread apart from one another by approximately the same distance 201 that exists between single-layer capacitive sensor 220 and a user input surface 261 of a stackup 200 in which the single-layer capacitive sensor 220 is disposed. For example, this coupling can exist between routing trace 311-2A and routing trace 321-2, between routing trace 311-1A and routing trace 321-1, between routing trace 311-3A and routing trace 321-5, and between routing trace 311-4A and routing trace 321-6. This sensitivity to and transcapacitive coupling with an input object is unwanted and can be highly irregular.

Increasing the size of gap 306 between a grouping of routing traces 311 that are coupled with receiver electrodes 310 and between a grouping that includes routing traces 321 coupled with transmitter electrodes 320 can reduce the number of such undesired couplings between routing traces an input objects in border region 303. That is to say, gaps between routing traces 311 coupled with receiver electrodes 310 and routing traces 321 coupled with transmitter electrodes 320 are set such that some routing traces 321 coupled with transmitter electrodes 320 are further from any routing traces 311 coupled with receiver electrodes 310 than a distance between a user input surface 261 of the stackup 200 in which they are disposed and the common layer in which routing traces 311 and 321 are disposed. For example, in FIG. 3A, routing traces 321-3 and 321-4 fall outside of the range of distance 201 associated with any routing trace 311. However, in embodiments described herein, size constraints associated with stackup 200 are such that is not possible to increase spacing enough to position all routing trace pairs 311 and 321 outside of a distance 201 with respect to one another while still permit ACF bonding. Thus, increasing the distance of gap 306 may decrease or eliminate some, but not all transcapacitive couplings between routing traces 311 and 321.

In border region 303 routing traces 311 that are coupled with receiver electrodes 310 are grouped together with one another and routing traces 321 that are coupled with transmitter electrodes 320 are coupled with one another. A transmission trace 341 is disposed between a grouping of routing traces 311 and a grouping of routing traces 321. For example, transmission trace 341-1 is disposed between routing trace 311-2A and routing trace 321-1. Likewise, transmission trace 341-2 is disposed between routing trace 311-3A and routing trace 321-5.

In border region 303 a grouping of routing traces 321 (e.g., 321-1 to 321-6) that are coupled with transmitter electrodes 320 (this grouping includes no routing traces 311 that are coupled with receiver electrodes 310) is bracketed between a pair of transmission traces 341 (e.g., between transmission traces 341-1 and 341-2).

In some embodiments, the pair of transmission traces 341 (341-1 and 341-2) are further bracketed by routing traces 331 (e.g., 331-1 and 331-2) that form ground traces in extending into user input region 302. In this manner, routing traces 331 are disposed between the bracketing transmission traces and a grouping of routing traces 311 that are coupled with receiver electrodes 310. For example, trace 331-1, when included, is disposed between routing trace 311-2A and transmission trace 341-1 with no intervening traces 321. Likewise, trace 331-2, when included, is disposed between routing trace 311-3A and transmission trace 341-2 with no intervening traces 321.

FIG. 3B is a top plan view of a portion of a single-layer capacitive sensor 220B, according to some embodiments. FIG. 3A is similar to FIG. 3B except that routing traces 311-1A, 311-2A, 311-3A, and 311-4A have been replaced, respectively, with routing traces 311-1B, 311-2B, 311-3B, and 311-4B and all gaps 305 between routing traces 311, 321, and 331 and/or transmission traces 341 are substantially the same rather than having some larger gaps 306 as was illustrated in FIG. 3A. It should be appreciated that gaps between routing traces 311, 321, and 331 and/or transmission traces 341 may all be the same or that some may be larger or smaller than others, in various embodiments, so long as routing traces 311, 321, and 331 and/or transmission traces 341 fit within an allotted amount of space in a stackup 200 and are configured to permit ACF bonding.

As was previously described with respect to FIG. 3A, coupling with input objects and portions of a border region 303 of a single-layer capacitive sensor 220 can have its largest prevalence between pairs of routing traces 311, 312 that are spread apart from one another by approximately the same distance 201 that exists between single-layer capacitive sensor 220 and a user input surface 261 of a stackup 200 in which the single-layer capacitive sensor 220 is disposed. Due to the substantially equivalent size of gaps 305 in single-layer capacitive sensor 220B, this coupling can exist between routing trace 311-2B and routing trace 321-3, between routing trace 311-1B and routing trace 321-2, between routing trace 311-3B and routing trace 321-4, and between routing trace 311-4B and routing trace 321-5. Presence of additional routing traces 311 above routing trace 311-1B and below routing trace 311-4B may, in some embodiments, mean that all routing traces 321 in the grouping 321-1 to 321-6 are subject to this transcapacitive coupling which is unwanted and can be highly irregular.

Referring now to FIGS. 3A and 3B, inclusion and use of transmission traces 341 can reduce and/or eliminate these unwanted transcapacitive couplings in border region 303. In various embodiments, a transmission trace 341 (e.g., 341-1) can be used to transmit or receive a signal, much in the manner of transmitter electrodes 320 and receiver electrodes 310 that are located in user input region 302. For example, each transmission trace 341 may be independently coupled with a different transmitter channel of processing system 110, or two or more (or all) transmission traces may be coupled to a common transmitter channel of processing system 110. In one embodiment, when no signals are being transmitted through routing traces 321, processing system 110 transmits a transmitter signal on one or more transmission traces 341 and receives a resulting signal by sensing on channels coupled with one or more routing traces 311 that are coupled with receiver electrodes 310. In this manner, a baseline is established for an amount of transcapacitive coupling within border region 303 between one or more transmission traces 341 and one or more routing traces 311. Comparisons to this baseline may later be used to determine the existence of an unwanted capacitive coupling between an input object and a routing trace 311. For example, by periodically repeating this baseline measurement and noting changes, the presence of input object transcapacitive coupling can be noted. When it is noted, processing system 110 can employ various techniques, which may occur in firmware, to reduce or eliminate the effects of the transcapacitive coupling to the input object that encroaches on a transcapacitive coupling between a pair of routing traces 311 and 321. For example, all or a portion of the measured coupling that is attributable to an input object can be subtracted when making transcapacitive measurements using a pair of routing traces 311, 321. With reference to FIG. 3A, in one embodiment, if a finger or other input object is positioned over routing traces 311-1A and 311-2A in border region 303, there would likely be a change to their baseline when a baseline is measured by transmitting with one or more transmission traces 341, but not to the baselines associated with routing traces 311-3A and 311-4A. This changed baseline can be used as an indicator to modify any transcapacitive measurements made in user input region 302 using routing traces 311-1A and 311-1B while the changed baseline exists.

At other times, when a transmission trace 341 is not being used to measure a baseline, it can be floated or driven with a fixed or varying voltage potential. With reference to FIG. 3A in one embodiment, transmission trace 341 can be coupled with a fixed potential such as ground or some voltage offset from ground, and will act as a shield between routing traces 311-1A and 311-2A and routing traces 321-1 to 321-6 while transmitter signals of varying potential are being driven on one or more routing traces 321-1 to 321-6. With continued reference to FIG. 3A in one embodiment, transmission trace 341 can be coupled with a variable potential that is out of phase (such as 180 degrees out of phase) with a transmitter signal being driven through one or more of routing traces 321-1 to 321-6, and will act as a guard between routing traces 311-1A and 311-2A and routing traces 321-1 to 321-6 while transmitter signals are being driven on one or more routing traces 321-1 to 321-6. In some embodiments, when a transmission trace is being used for guarding it reduces a net radiated voltage measured in border region 303 to substantially zero. It should be appreciated that the difference between a transmission trace 341 and a guard trace is that a transmission trace is configured and operated, at times, to transmit a signal that is intended to be received on by a routing trace 311 that is coupled to a receiver electrode 310.

Example Capacitive Sensing Input Device

Figure 4A:
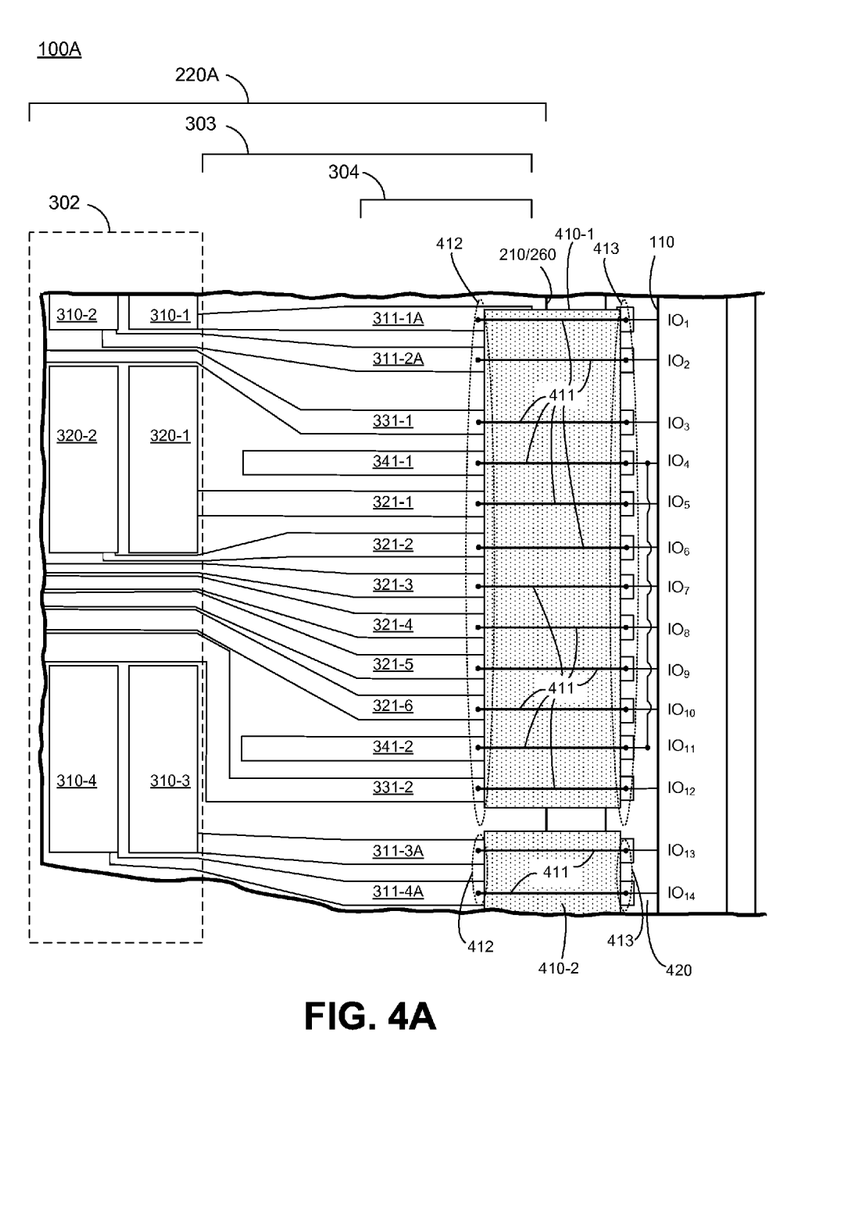
FIG. 4A depicts a portion of an example capacitive sensing input device, according to some embodiments.
Figure 4B:
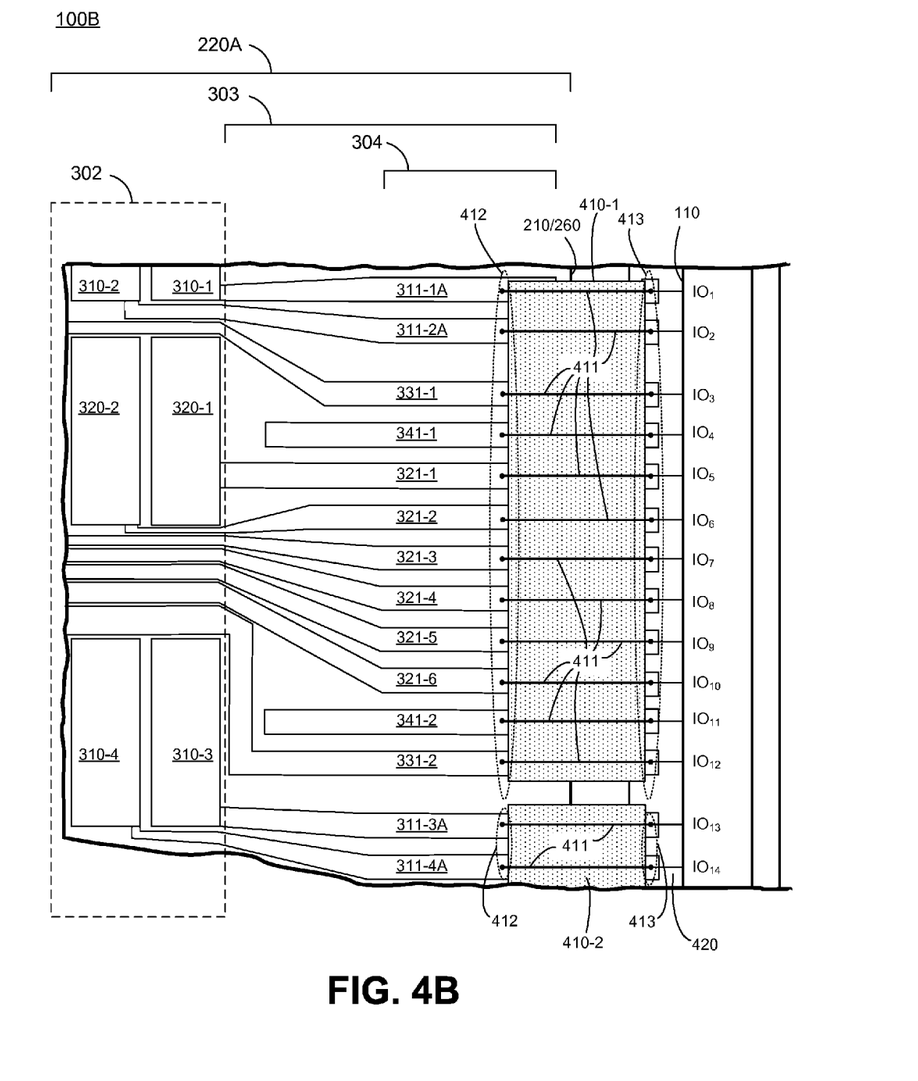
FIG. 4B depicts a portion of an example capacitive sensing input device, according to some embodiments.

FIG. 4A depicts a portion of an example capacitive sensing input device 100A, according to an embodiment. Capacitive sensing input device 100A includes a single-layer capacitive sensor 220, such as 220A, a processing system 110, and one or more flexible printed circuits (FPCs) 410 (410-1 and 410-2 depicted) coupling the two together. FPC 410-1 includes a plurality of conductors 411 of a printed circuit that is bonded in bonding region 304 with ACF bonds 412 (symbolically depicted) such that they ohmically couple with routing traces 311, 321, and 331 and transmission traces 341 on one distal end and with bonds 413 such that they ohmically couple with conductors coupled with input/outputs (IO1 to IO12) of processing system 110 on an opposite distal end. For example, a conductor 411 of FPC 410-1 bonds 412 with routing trace 311-2A on one distal end and with a conductor that is coupled with IO2 of processing system 110 on an opposite distal end; another conductor 411 of FPC 410-1 bonds 412 with routing trace 331-1 on one distal end and with a conductor that is coupled with IO3 of processing system 110 on an opposite distal end; another conductor 411 of FPC 410-1 bonds 412 with transmission trace 341-1 on one distal end and with a conductor that is coupled with IO4 of processing system 110 on an opposite distal end; and another conductor 411 of FPC 410-1 bonds 412 with routing trace 321-1 on one distal end and with a conductor that is coupled with IO5 of processing system 110 on an opposite distal end. FPC 410-2 similarly includes a plurality of conductors 411 that are bonded with ACF bonds 412 in bonding region 304 on one distal end and with input/outputs (e.g., IO13 and IO14) of processing system 110 on an opposite distal end. As can be seen, IO4 of processing system is commonly coupled with both transmission trace 341-1 and with transmission trace 341-2. This allows a single IO of processing system 110 to operate a plurality of transmission traces 441. In other embodiments, two or more transmission traces 341 may be coupled to different IOs of processing system 110, rather than being commonly coupled to a single IO. FIG. 4B illustrates one example of such an embodiment.

FIG. 4B depicts a portion of an example capacitive sensing input device 100B, according to an embodiment. Capacitive sensing input device 100B is similar to capacitive sensing input device 100A of FIG. 1, except that transmission traces 431-1 and 431-2 are each coupled with a separate IO of processing system 110. For example, a conductor 411 of FPC 410-1 bonds 412 with transmission trace 341-1 on one distal end and with a conductor that is coupled with IO4 of processing system 110 on an opposite distal end while another conductor 411 of FPC 410-1 bonds 412 with transmission trace 341-2 on one distal end and with a conductor that is coupled with IO11 of processing system 110 on an opposite distal end.

Example Processing System

Figure 5:
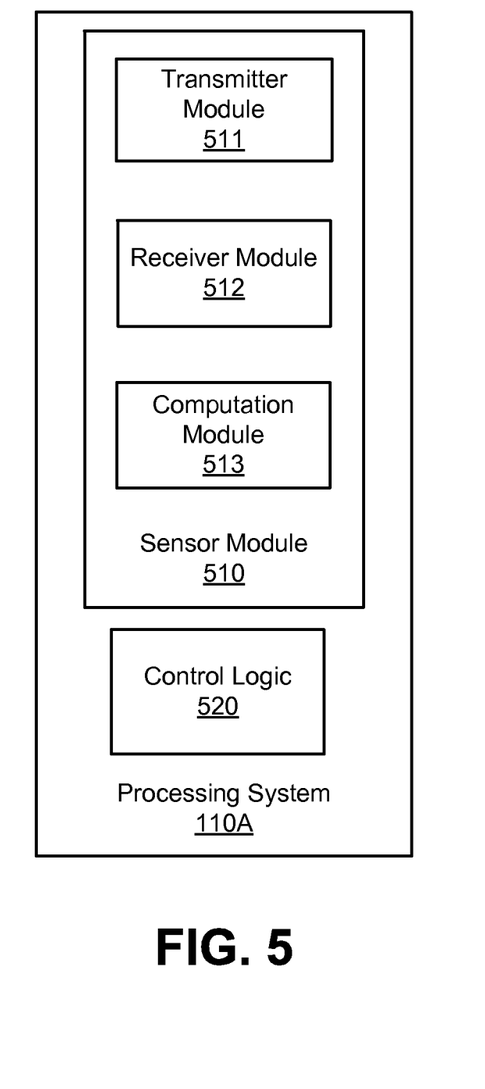
FIG. 5 shows a processing system which may be utilized in a capacitive sensing input device, according to some embodiments.

FIG. 5 illustrates a block diagram of some components of an example processing system 110A that may be utilized with an input device (e.g., in place of processing system 110 as part of input device 100), according to various embodiments. Processing system 110A may be implemented with one or more Application Specific Integrated Circuits (ASICSs), one or more Integrated Circuits (ICs), one or more controllers, or some combination thereof. In one embodiment, processing system 110A is communicatively coupled with one or more transmitter electrode(s) and receiver electrode(s) that implement a sensing region 120 of an input device 100. In some embodiments, processing system 110A and the input device 100, of which it is a part, may be disposed in or communicatively coupled with an electronic system 150, such as a display device, computer, or other electronic system.

In one embodiment of input device 100, processing system 110A includes, among other components: sensor module 510, and control logic 520. Processing system 110A and/or components thereof may be coupled with sensor electrodes of a sensor electrode pattern, such as sensor electrode pattern 200. For example, sensor module 510 is coupled with one or more sensor electrodes of a sensor electrode pattern (e.g., sensor electrode pattern 200) of input device 100.

Sensor module 510 operates to interact with receiver electrodes 310 and transmitter electrodes 320 of a single-layer capacitive sensor 220 that is utilized to generate a sensing region 120. This includes operating transmitter electrodes to float, be held at a high impedance, be held at a constant or variable voltage, or to transmit a transmitter signal. This also includes utilizing receiver electrodes to receive resulting signals and other signals. Sensor module 510 may also determine from received resulting signal(s) that an input has occurred in sensing region 120, as well as determining a location of the input with respect to sensing region 120. Sensor module 510 may further determine that unwanted coupling to an input object is occurring in a border region 303 of the single-layer capacitive sensor 220. As depicted in FIG. 5, sensor module 510 may include one or more of transmitter module 511, receiver module 512, and computation module 513. With reference to FIGS. 4A, 4B, and 5, in one embodiment sensor module 510 is coupled with IO1 through IO14.

Transmitter module 511 operates, in some embodiments, to transmit transmitter signals on one or more transmitter electrodes 320. In a given time interval, transmitter module 511 may transmit or not transmit a transmitter signal (waveform) on one or more of a plurality of transmitter electrodes 320. Transmitter module 511 may also be utilized to couple one or more transmitter electrodes 320 (and respective transmitter path(s)) of a plurality of transmitter electrodes 320 to high impedance, ground, or to a constant voltage when not transmitting a waveform on such transmitter electrodes. The transmitter signal may be a square wave, trapezoidal wave, or some other waveform that varies. Transmitter module 511 may code a transmitter signal, such as in a code division multiplexing scheme. The code may be altered, such as lengthening or shortening the code, under direction of control logic 520. Lengthening the code is one technique for avoiding interference.

Transmitter module 511 operates, in some embodiments, to transmit signals on one or more transmission traces 341. In a given time interval, transmitter module 511 may transmit or not transmit a signal (varying waveform) on one or more of a plurality of transmission traces 341 while either transmitting or not transmitting on one or more transmitter electrodes 320. The transmitted signal may be the same as a transmitter signal that is transmitted on a transmitter electrode 320 at another period in time, or may be out of phase (e.g., of opposite polarity that is 180 degrees out of phase with the transmitter signal). For example, in one embodiment transmitter module 511 transmits a transmitter signal on transmitter electrode 320-1 and simultaneously transmits a signal that is of opposite polarity on transmission trace 341-1 or on all transmission traces 341. Transmitter module 511 may also be utilized to couple one or more transmission traces 341 to high impedance, ground, or to a constant voltage potential offset from ground when not transmitting a waveform on such transmission traces. In one embodiment, a transcapacitive sensing frame includes transmitter module 511 transmitting a transmitter signal in-turn once on each transmitter electrode 320 and also transmitting the transmitter signal (or other varying wave form) once on at least one transmission trace 341. In another embodiment, transmitter module 511 may transmit the transmitter signal (or other varying waveform) on the at least one transmission trace 341 only on every Nth frame, where N has a value greater than one, such as 2, 3, 4, or 5, such that some number of frames do not include a varying waveform being transmitted in turn onto at least one transmission trace.

Receiver module 512 operates to receive resulting signals, via receiver electrodes 310. The received resulting signals correspond to and include some version of the transmitter signal(s) transmitted via the transmitter electrodes and/or the signals transmitted on transmission traces 341. For example, in one embodiment, receiver module 512 receives a resulting signal from receiver electrode 310-1 and/or receiver electrode 310-2 while a transmitter module 511 drives a transmitter signal on transmitter electrode 320-1. Similarly, in one embodiment, receiver module 512 receives a resulting signal from routing trace 311-1A and/or routing trace 311-2A while transmitter module 511 drives a varying waveform signal, such as a transmitter signal, on transmission trace 341-1 or simultaneously on all transmission traces 341 (at this same time, transmitter module 511 can allow transmitter electrodes 320 to float or maintain them at a fixed potential). The signals that are driven on and transmitted from transmitter electrodes 320 and/or transmission traces 341, however, may be altered or changed in the received resulting signals due to stray capacitance, noise, interference, and/or circuit imperfections among other factors, and thus may differ slightly or greatly from their transmitted versions. Resulting signals may be received on one or a plurality of receiver electrodes 310 and/or routing traces 311 during a time interval. Receiver module 512 includes a plurality of amplifiers, typically one per receiver electrode.

Computation module 513 operates to compute/determine a measurement of a change in a capacitive coupling between a transmitter electrode and a receiver electrode. Computation circuitry then uses this measurement to determine the position of an input object (if any) with respect to sensing region 120. Computation module 513 also operates to compute/determine a measurement of a change in a capacitive coupling between a transmission trace 341 and a routing trace 311 that is coupled with a receiver electrode 310. Computation circuitry then uses this measurement to determine whether or not an unwanted capacitive coupling exists between an input object and a routing trace 311 in border region 303 of a single-layer capacitive sensor 220. This can be done by comparing a baseline measurement with no input object coupling to a successive measurement.

Control logic 520 comprises decision making logic which directs processing system 110A and sensor module 510 to operate in a selected one of a plurality of different operating modes based on various inputs. Some non-limiting examples of such inputs include one or more measurement(s) of capacitive coupling of an input object to routing traces in a border region 303 and/or not being sensed in a border region 303. Control logic may be implemented as hardware (e.g., hardware logic and/or other circuitry) and/or as a combination of hardware and instructions stored in a non-transitory manner in a computer readable storage medium.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

What is claimed is:

1. A single-layer capacitive sensor comprising:
    a user input region comprising:
        a plurality of transmitter electrodes within said user input region; and
        a plurality of receiver electrodes disposed in a common stackup layer with said transmitter electrodes within said user input region such that said transmitter electrodes and said receiver electrodes make no crossings of one another in said common stackup layer or in any other layer within said user input region; and
    a border region proximate to and outside of said user input region and located along one side edge of said user input region, said border region comprising:
        a plurality of routing traces extending from said border region into said user input region from said one side edge to couple with said transmitter electrodes and said receiver electrodes; and
        a plurality of transmission traces disposed entirely within said border region, wherein said transmission traces are configured for transmitting a signal for receipt by one or more routing traces of said plurality of routing traces.

2. The single-layer capacitive sensor of claim 1, wherein said border region comprises an anisotropic conductive film (ACF) bonding region.

3. The single-layer capacitive sensor of claim 1, wherein said plurality of transmission traces are ohmically separated from said plurality of transmitter electrodes and said plurality of receiver electrodes.

4. The single-layer capacitive sensor of claim 1, wherein said plurality transmission traces and said plurality of routing traces are disposed such that at least a portion of each transmission trace and at least a portion of each routing trace are in parallel.

5. The single-layer capacitive sensor of claim 1, wherein gaps between routing traces coupled with receiver electrodes and routing traces coupled with transmitter electrodes are set such that some routing traces coupled with transmitter electrodes are further from any routing traces coupled with receiver electrodes than a distance between a user input surface of said stackup and said common stackup layer.

6. The single-layer capacitive sensor of claim 1, wherein a first routing trace of said plurality of routing traces is coupled with a receiver electrode and a second routing trace of said plurality of routing traces is coupled with a transmitter electrode, and wherein a first transmission trace of said plurality of transmission traces is disposed between said first routing trace and said second routing trace.

7. The single-layer capacitive sensor of claim 6, wherein said second routing trace and a plurality of additional routing traces coupled to transmitter electrodes of said plurality of transmitter electrodes are disposed between said first transmission trace and a second transmission trace, and wherein no routing traces that are coupled with said receiver electrodes are disposed between said first transmission trace and said second transmission trace.

8. The single-layer capacitive sensor of claim 6, wherein a third routing trace of said plurality of routing traces forms a ground trace extending into said user input region, and wherein said third routing trace is disposed between said first routing trace and said transmission trace.

9. A capacitive sensing input device comprising:
a user input region comprising:
a plurality of transmitter electrodes disposed within said user input region; and
a plurality of receiver electrodes disposed in a common stackup layer within said user input region such that said transmitter electrodes and said receiver electrodes make no crossings of one another in said common stackup layer or in any other layer within said user input region;
a border region proximate to and outside of said user input region and located along one side edge of said user input region, said border region comprising:
a plurality of routing traces extending from said border region into said user input region from said one side edge to couple with said transmitter electrodes and said receiver electrodes; and
a plurality of transmission traces disposed entirely within said border region, wherein said transmission traces are configured for transmitting a signal for receipt by one or more routing traces of said plurality of routing traces; and
a processing system configured for:
driving signals on said transmitter electrodes;
driving signals on said transmission traces; and
receiving signals from said receiver electrodes.

10. The capacitive sensing input device of claim 9, further comprising:
an anisotropic conductive film (ACF) comprising:
a first distal end comprising a plurality of conductors ohmically coupled with input/outputs of a processing system; and
a second distal end comprising opposing ends of said conductors bonded within said border region to at least one of said plurality of transmission traces and to at least some of said plurality of routing traces.

11. The capacitive sensing input device of claim 10, wherein said processing system is configured to drive a first transmitter signal on at least one of said transmitter electrodes while receiving a first resulting signal from at least one of said receiver electrodes.

12. The capacitive sensing input device of claim 11, wherein said processing system is configured to drive an opposite polarity version of said first transmitter signal on at least one of said transmission traces while driving said transmitter signal on said at least one of said transmitter electrodes.

13. The capacitive sensing input device of claim 11, wherein said processing system is configured to drive a second transmitter signal on at least one of said transmission traces while receiving a second resulting signal from at least one of said receiver electrodes and while not transmitting on said transmitter electrodes.

14. The capacitive sensing input device of claim 9, wherein said border region comprises an anisotropic conductive film (ACF) bonding region.

15. The capacitive sensing input device of claim 9, wherein said plurality of transmission traces are ohmically separated from said plurality of transmitter electrodes and said plurality of receiver electrodes.

16. The capacitive sensing input device of claim 9, wherein said plurality of transmission traces and said plurality of routing traces are disposed such that at least a portion of each transmission trace and at least a portion of each routing trace are in parallel.

17. The capacitive sensing input device of claim 9, wherein gaps between routing traces coupled with receiver electrodes and routing traces coupled with transmitter electrodes are set such that some routing traces coupled with transmitter electrodes are further from any routing traces coupled with receiver electrodes than a distance between a user input surface of said stackup and said common stackup layer.

18. The capacitive sensing input device of claim 9, wherein a first routing trace of said plurality of routing traces is coupled with a receiver electrode and a second routing trace of said plurality of routing traces is coupled with a transmitter electrode, and wherein a first transmission trace of said plurality of transmission traces is disposed between said first routing trace and said second routing trace.

19. The capacitive sensing input device of claim 18, wherein said second routing trace and a plurality of additional routing traces coupled to transmitter electrodes of said plurality of transmitter electrodes are disposed between said first transmission trace and a second transmission trace, and wherein no routing traces that are coupled with said receiver electrodes are disposed between said first transmission trace and said second transmission trace.

20. The capacitive sensing input device of claim 18, wherein a third routing trace of said plurality of routing traces forms a ground trace extending into said user input region, and wherein said third routing trace is disposed between said first routing trace and said transmission trace.

* * * * *